Sept. 8, 1925.
J. H. MOCK
1,552,494
HORN SHAPER
Filed Feb. 24, 1923
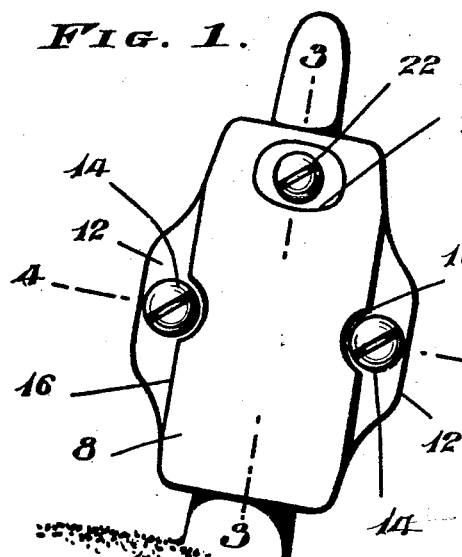
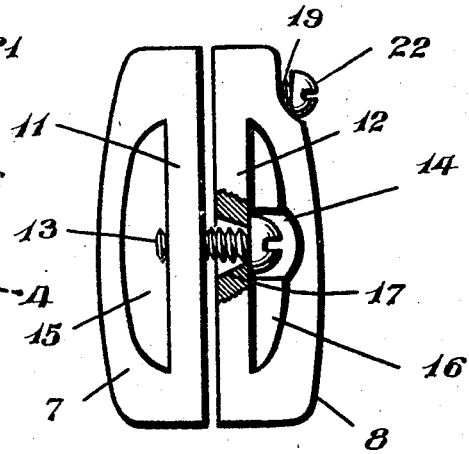
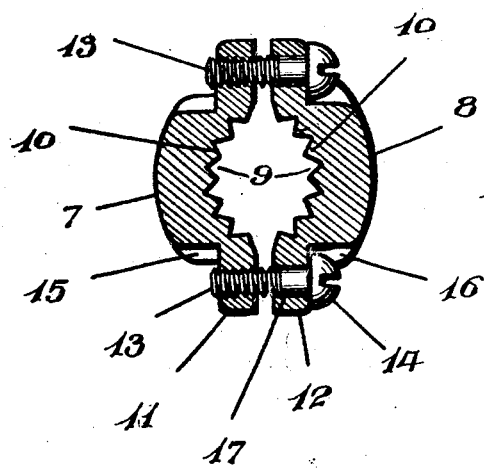
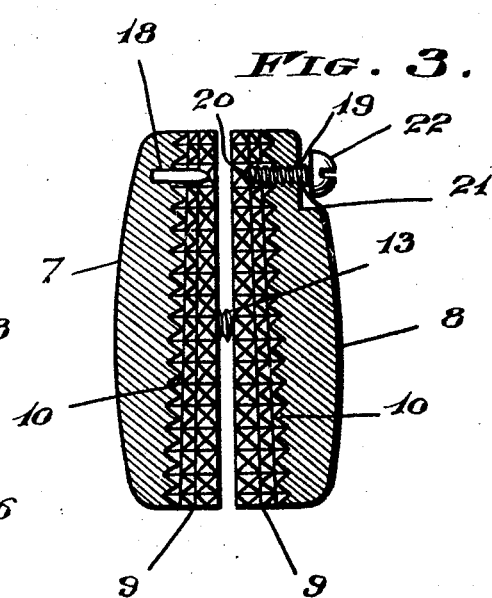
Inventor:
J. H. MOCK,
Attorney.

Patented Sept. 8, 1925.

1,552,494

UNITED STATES PATENT OFFICE.

JOHN H. MOCK, OF JETMORE, KANSAS.

HORN SHAPER.

Application filed February 24, 1923. Serial No. 620,940.

*To all whom it may concern:*

Be it known that I, JOHN H. MOCK, a citizen of the United States, residing at Jetmore, in the county of Hodgeman and State of Kansas, have invented certain new and useful Improvements in Horn Shapers; and I do hereby declare the following to be a full, clear, and exact description of the invention, such as will enable others skilled in the art to which it appertains to make and use the same.

The present invention relates to a device for shaping the horns of cattle, and aims to provide a novel device of that kind.

Another object is the provision of a horn shaper which is so constructed and adjustable as to be applicable to different shapes and sizes of horns.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a side elevation of the device as applied to a horn.

Fig. 2 is a side elevation looking at right angles to the line of view in Fig. 1, a portion being broken away and shown in section.

Fig. 3 is a longitudinal section on the line 3—3 of Fig. 1 of the device itself.

Fig. 4 is a cross section on the line 4—4 of Fig. 1.

The device comprises a combined weight and clamp to embrace the horn, so as to confine the horn therein and impose weight on the horn, for the purpose of shaping the horn. The clamp is of tubular form and is composed of the sections or halves 7 and 8, the clamp being divided longitudinally, and said sections are of metal and are comparatively thick so as to be rigid and to supply the desired weight when applying the device to the horn. The sections 7 and 8 have the grooves or channels 9 at their inner or confronting sides, and said grooves or channels are tapered from the lower to the upper end of the clamp, to conform generally to the taper of the horns of cattle. The surfaces of the channels or grooves 9 are toothed or serrated, as at 10, to bite the surface of the horn on which the clamp is disposed.

In order to secure the sections 7 and 8 together, they are provided at their opposite edges with the outstanding flanges 11 and 12, respectively, through which the clamping screws 13 extend, said screws being screw-threaded through the flanges 11 and having heads 14 bearing against the flanges 12. The screw heads 14 are slotted for the engagement of a screw driver or other implement. The section 7 has recesses 15 between it and the flanges 11, to accommodate the ends of the screws, and the section 8 has similar recesses 16 between it and the flanges 12 to accommodate the screw heads 14, whereby the screws are prevented from constituting objectionable obstructions on the device. The apertures 17 in the flanges 12 through which the screws extend loosely are tapered, as seen in Fig. 2, so as to be elongated longitudinally at their inner ends, thereby permitting the sections 7 and 8 to be tilted to different angles relatively to one another, when applying the device to horns having different degrees of taper.

A pin 18 is secured in the section 7 near the upper end thereof and has a pointed end projecting into the groove 9 of said section, to be forced into the horn when the clamp is applied, to prevent the device from slipping out of position or off of the horn. A screw 19 is threaded into the section 8 near the upper end thereof opposite to the pin 18 and has an inner pointed end or tip 20 to be forced into the horn, when the screw is tightened, to assist in holding the device in place on the horn. The section 8 has a recess 21 for receiving the head 22 of the screw 19.

Before applying the device to the horn, the screws 13 and 19 are loosened, permitting the sections 7 and 8 to be separated, and the device is then conveniently slipped on the horn and moved to the desired position. Then, by tightening the screws 13, the device is made to tightly embrace the horn, and the pin 18 is forced into the horn, to lock the device in place. The sections 7 and 8 will adjust themselves to the proper angle according to the degree of taper of the horn, and the device will apply the desired pressure and weight to the horn for shaping it accordingly. The screw 19 is then tightened to enter the horn and assist the pin 18 in retaining the device in place.

Having thus described the invention, what is claimed as new is:—

1. A horn shaper comprising a tubular clamp adapted to embrace a horn and divided longitudinally into separate sections, said sections having tapered grooves in their adjacent sides to fit the horn, and said sections having flanges at their opposite edges, and clamping elements connecting said flanges to draw the sections toward one another when said elements are tightened, some of the flanges having portions engaging said elements and so formed as to permit the sections to be adjusted to different angles relatively to one another.

2. A horn shaper comprising a clamp to embrace a horn composed of separate sections having grooves to fit the horn, said sections having flanges at their opposite edges, and clamping elements extending through said flanges, some of the flanges having apertures for said elements of such shape as to permit the sections to be adjusted to different angles relatively to one another.

In testimony whereof I have signed my name to this specification.

JOHN H. MOCK.